United States Patent [19]

Shreck et al.

[11] Patent Number: 4,608,601
[45] Date of Patent: Aug. 26, 1986

[54] VIDEO RESPONSE TESTING APPARATUS

[75] Inventors: Peter K. Shreck, Truro; John Dudding, Falmouth, both of United Kingdom

[73] Assignee: The Moving Picture Company Inc., Wilmett, Ill.

[21] Appl. No.: 512,490

[22] Filed: Jul. 11, 1983

[30] Foreign Application Priority Data

Jul. 12, 1982 [GB] United Kingdom ............... 8220181

[51] Int. Cl.$^4$ .............. H04N 7/04; H04N 7/08
[52] U.S. Cl. ..................... 358/146; 358/93; 340/707; 434/323
[58] Field of Search ............. 358/146, 93, 183; 340/702, 707, 720, 721; 434/308, 323; 273/DIG. 28; 382/59, 65

[56] References Cited

U.S. PATENT DOCUMENTS 3,599,221 8/1971 Baer ............................ 434/323
3,993,861 11/1976 Baer ............................ 358/146
4,329,684 5/1982 Monteath et al. .............. 340/707

FOREIGN PATENT DOCUMENTS

948400 6/1974 Canada ....................... 434/323

Primary Examiner—James J. Groody
Assistant Examiner—Michael D. Parker
Attorney, Agent, or Firm—Watson Cole Grindle & Watson

[57] ABSTRACT

Apparatus for testing the response of a viewer to questions or problems displayed on a video screen comprises apparatus to modulate the video signal to display coded patches on the screen. The patches are coded by alternately raising and lowering the luminance signal of the video without destroying spacial variations of the signal in the patch. The coding is detected by a probe having a light guide pointer conducting light from the video screen to a photo-detector in the casing of the probe. The coded luminance variations are read by the probe and produce response indications such as sound or light signals which qualify the response. The apparatus is useful as a teaching aid.

10 Claims, 9 Drawing Figures

VIDEO RESPONSE TESTING APPARATUS

BACKGROUND OF THE INVENTION

1. Field of the Invention

The present invention relates to a video response testing apparatus in which coded signals can be displayed on the display screen of video display apparatus, eg., a television screen, and detected and decoded using a sensing probe. With such a system, coded signals can be applied to the picture of a television screen which can be arranged to be undecipherable when viewed by a person watching the television but which can be detected by a sensing probe handled by the person and then deciphered. In one application of this invention, the apparatus may be used, eg. as a teaching aid, to test the responses of a person viewing the television picture to questions displayed on the screen. For example, if a question is displayed in a multiple answer form, with each of a number of possible answers at different locations on the television screen, the sensing probe can be applied to a part of the television screen associated with a chosen one of the possible answers and arranged to react to coding on the screen to indicate whether or not that answer is the correct one.

2. Description of the Related Art

The specification of Canadian Pat. No. 948400 describes an apparatus of this general kind. In this specification, there is described an arrangement in which multiple answer questions displayed on the television screen can be flagged by respective coded patches. The television signal is arranged so that the coded patches flash in a manner indicative of whether the respective answer is correct or incorrect. The flashes are arranged so as not to be decipherable to the eye but can be decoded by a suitable probe handled by the viewer. In the Canadian example, the coding is done by arranging for the code patch on the screen to flash either an even number or an odd number of times to indicate a correct or incorrect answer respectively.

Such an arrangement as described in the Canadian specification has possible applications but also important limitations. The coding system described is very simple and also appears prone to possible errors, for example if one of a sequence of flashes is accidentally missed by the sensing probe so that the probe indicates a correct answer instead of a wrong answer, or vice versa. Furthermore the nature and content of the information supplied by the coded patches is very limited. Furthermore no details are given of how the system is to be put into practice.

SUMMARY OF THE INVENTION

According to one aspect of the present invention, video response testing apparatus comprises video display apparatus including a display screen and for displaying video pictures on the screen, a transmitter for sending video signals, including a luminance signal, to the display apparatus for the display thereby of corresponding video pictures, picture area defining means at the transmitter for defining at least one selected area of the video picture represented by the video signals being sent, modulation means responsive to the picture area defining means and arranged for modulating the luminance signal of the video signals being sent to alternately raise and lower the luminance level represented by the luminance signal in said at least one selected area without destroying the original luminance signal variations in said area, encoding means controlling the modulation means to raise and lower said luminance level in accordance with a desired binary code, the rate of alternate raising and lowering of said luminance level and the selection of code formats being such as to make the code visually undecipherable when viewed on the display screen, and a sensing probe including a photo sensitive element, the probe being positionable to enable the element to respond to variations in picture brightness in said selected area on the display screen and arranged to decode the binary code represented thereby.

By this apparatus, a more comprehensive facility is provided for passing data to a television screen for reading from the screen by means of the sensing probe. The binary coding of the data may be arranged in a format enabling a substantial variety of information to be represented on the screen. However in all cases the coding appearing in the selected area or patch on the screen is visually undecipherable to a viewer. Thus where there are several such selected areas encoded differently on the video display screen, the different codes can be used to qualify or test a response made by the viewer to a question displayed on the screen. The viewer responds by directing the sensing probe to a selected one of the code patches and the detected code can then indicate the correctness or otherwise qualify the response made.

It is also an important feature of the above aspect of the invention that the coding is applied to the video signal displayed on the screen by modulating the luminance but without destroying the original luminance signal variations. This arrangement is founded on the realization that the luminance of a small patch of a video picture on a display screen is liable to vary from one frame to the next only if the picture being displayed is a moving picture. Thus, in the present arrangement, a variation in the luminance of a fixed patch of the video display can be considered to represent the desired coding. The coding can thus be detected from the display irrespective of the background luminance level of the patch in question. Indeed, if the format of the binary code applied to the patch of the screen is carefully selected, the overall luminance of the patch can be left substantially unaffected, since periods of increased luminance can be cancelled by alternate periods of relatively reduced luminance. The time averaging effect of the eye may make the luminance variations almost indiscernable.

Preferably, the picture area defining means is arranged for defining a plurality of selected said areas, each located to be associated with a respective symbol or element of the video picture. In one example, each said area is located to be superimposed on at least part of its associated symbol or element.

Preferably, the rate of raising and lowering of said luminance level is synchronised with successive fields of a T.V. scanned-type video display apparatus. Thus, successive fields of the display can represent successive bits of the binary code. The binary code may be represented by successive serial words each of a predetermined number of bits, and the code format may be such that each word has substantially the same number of binary "0" and binary "1". Thus, the overall luminance of a coded patch or area during the course of one binary word is unaffected since the number of frames in which the luminance is raised is equal to the number of frames in which the luminance is lowered.

In one embodiment, the sensing probe has a casing containing the photo sensitive element and decoding circuitry responsive thereto, and an elongate light guide extending from the casing to conduct light entering a remote end of the guide down the guide and into the casing to illuminate the photo sensitive element. This structure enables the sensing probe to be made with an elongate pointer, constituted by the light guide, but without the need for the photo sensitive element to be located at the remote end of the pointer.

Normally, the decoding circuitry includes indicating means to indicate the sense of the decoded data to a user of the probe. This indicating means may comprise a sound generator, for example generating different sounds to indicate a correct or incorrect answer. Alternatively, the indicating means may comprise indicator lamps, or in a more sophisticated embodiment may take the form of speech synthesising circuitry designed to make the sensing probe "speak" in response to code read from the video display screen.

The decoding circuitry may include a microprocessor and memory arranged to manipulate the decoded data and store indications derived therefrom in the memory, and a data exit port enabling the stored indications to be dumped from the memory to an external utilisation apparatus.

In accordance with another aspect of the present invention, a video response testing apparatus comprises a sensing probe for reading and reacting to data modulated on to a selected area of a video picture on a display screen by varying the luminance of the display picture in said area in accordance with a desired code, the probe having a casing containing a photo sensitive element and decoding circuitry responsive thereto, and an elongate light guide extending from the casing to conduct light entering a remote end of the guide down the guide and into the casing to illuminate the photo sensitive element.

In summary, and in accordance with the above described invention and the various preferred embodiments and features thereof, the display screen may show not only programme information but also a number of target areas containing the response evaluation signals or code. These latter may be visually distinguishable as separate areas, for example as boxes adjacent certain parts of the display, or as areas which are coextensive with the symbols or elements on the display. However, the selected target area may extend over the entire area of the display screen so that the code can be read by directing the sensing probe to any part of the screen. Such an arrangement may be useful when answers to a question, for example, are displayed sequentially taking up the whole display screen, rather than at the same time using different parts of the screen.

The probe preferably includes means for reacting to an incorrect selection of a reponse in one of a number of preselectable ways. First, selecting an incorrect response may generate simply an identifiable "wrong response" signal in the form of an audio tone or synthesised speech signal, and/or a visible indication on the response unit, as the probe can then be moved to a different location on the screen to search out the correct response. This is not entirely satisfactory in the sense that a correct response could be found merely by a systematic search of the screen without the user actually properly responding to the programme content in the intended manner. For this reason it is possible for the probe to be programmed so that it will be disabled after the first or a predetermined number of incorrect responses have been generated. Internal systems in the probe may be provided to keep "score" of the number of correct and incorrect responses made in the particular sequence.

In a more sophisticated embodiment each set of signals identifying an incorrect response may also contain signals identifying the correct response and/or other information such as may be used in a teaching situation for example for reinforcement of the learning process. This may include information on how close the response is to the correct response (which may be useful in teaching mathematics or other numerically dependent subjects). This information could then be fed to the speech synthesiser to generate the audible response evaluation. Because it only "reads" the signals on the screen the user probe needs no connections to either the programme content store or generator (which may be a recorder or a broadcast station respectively), nor to the display unit. By using a battery or dry cell as the probe power system this can be entirely free of any encumbering power supply leads or wires enabling the user complete freedom of movement.

The "target" areas may be stationary areas or may be moving areas requiring motor coordination skill in following the "target" with the probe. Similarly "target" areas in the form of a maze may be projected onto the screen in either a distinguishable or an indistinguishable manner for the user to follow with the sensor tip of the response unit.

It is important to realise that the probe itself carries no information about the location on the screen of its sensing tip, it merely "reads" the response evaluation signals which it senses due to its proximity. The unit may, however, have a built in or programmed response programme which generates different responses to subsequent questions in dependance on the responses given to previous questions. This amounts in effect to the known techniques of branching sequences based on remediation which will be familiar to those in the teaching field.

DESCRIPTION OF THE PREFERRED EMBODIMENTS

Figures 1, 2:
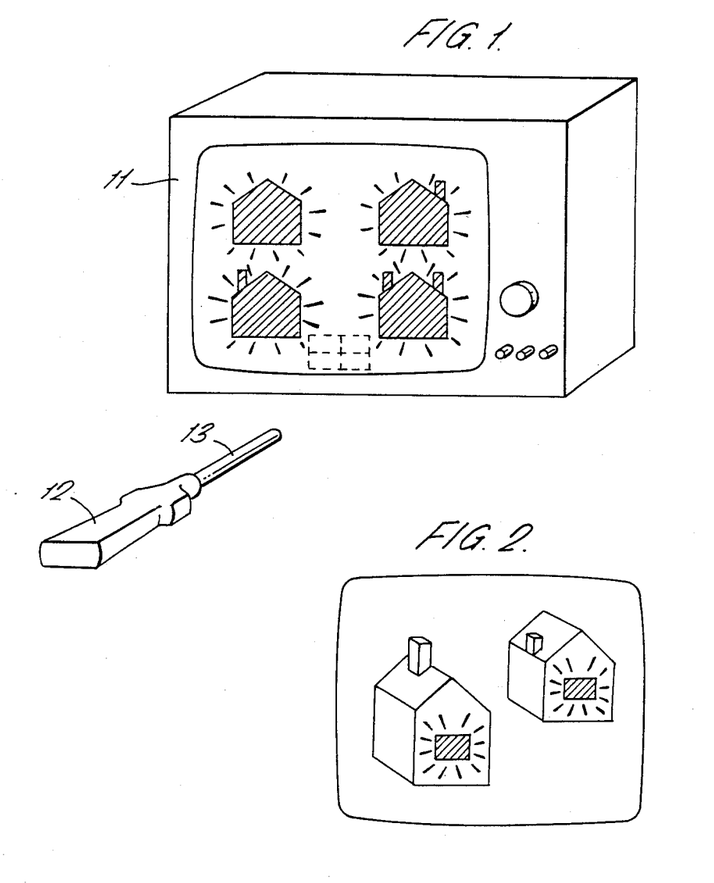
FIG. 1 is a perspective view illustrating video response testing apparatus according to the present invention.
FIG. 2 is a front view of a screen showing a representation which may be displayed by the system of FIG. 1.

Referring first to FIGS. 1 and 2, the video response testing apparatus of the present invention basically comprises a video display unit such as a television receiver 11 and a small hand held sensing probe independent of the receiver 11 in the sense that it is not connected thereto by any wires, thereby leaving the user free to operate the probe 12 without any hinderance or restriction on movement which wires might cause.

The programme material for display by the receiver may be generated at a studio and broadcast in a conventional manner, or may be transmitted to the receiver by cable or may be stored on any recording medium suitable for video storage techniques or systems, and generated by play back of the medium on a suitable reproduction unit. The generation of the programme content signals involves basically three types of information. First, the basic information in the programme which may be called the teaching information; then in order to reinforce the learning process a number of questions may be posed as part of the programme, these questions constituting a second type of information, and thirdly, in order to enable a user response, the VDU must provide a set of potential answers to the questions being posed in the programme. Conveniently the answers are provided as alternatives displayed on the screen. For simple teaching programmes, which would be suitable for children at an early stage of learning the available alternatives may be presented as visual displays of objects, whereas for more sophisticated and advanced teaching programmes the answers may be in the form of writing or alphanumeric script presented in a number of rows on the screen. Discovery learning methods can be programmed into the system which can be used with any known programmed teaching techniques.

In the example illustrated in FIG. 1 the four potential answers are displayed as four different outline diagrams of houses, one with no chimney, one with a chimney on the right hand side of the roof, one with a chimney on the left hand side of the roof and one with two chimneys, one on each side. The question in the programme content then may be, for example, "identify the house with the chimney on its left?". The final class of signals constitutes response evaluation signals which in this case are generated as variations in the luminance level over the areas of the objects displayed on the screen, this variation being at a frequency and with a spacing which prevents the user from being able to decipher the information. The luminance level variations are superimposed on the normal luminance signal in the coded areas and does not destroy any variation of the original luminance level across the area. All of the potential responses will be coded and thus be caused to vary in luminance level but the frequency or code incorporated will not be identifiable to the user. In response to the question posed the user must place the tip of a pointer 13 of the probe 12 closely adjacent the selected displayed object. The probe then "reads" the code generated on the coded part of the screen to identify whether it is a correct or incorrect response to the question.

In FIG. 2 the alternative arrangement of having a "target" area as a regular shape within the object is illustrated. This "target" area in the illustration of FIG. 2 is a rectangular area located within the object which it identifies although, of course, the "target" area could be located at some other position, either closely adjacent the object being identified or in a corresponding position on a different part of the screen. For example, if the choice of responses is identified as four different objects such as in the arrangement of FIG. 1 a separate "target" area having four different quarters as indicated in broken outline could be provided to give corresponding locations for selection.

In the arrangement described above the coded "target" areas incorporate a temporal code identifying correct and incorrect responses, it being only necessary to provide two codes in a simple Yes/No situation where one of the responses is correct and has the "Yes" code and the remaining choices are incorrect and have corresponding "No codes associated therewith. There may be a number of different codes identifying different ranges of choice to allow pupils with different levels of ability to progress through a programme. As a simple example the screen may display the answers to a question in graphic and script manner with a greater score being assigned to the correct script answer than to the correct graphic answer and all the codes identifying the script answers carrying an indication so that it is possible for the response unit to know that a script answer has been attempted.

Figure 4:
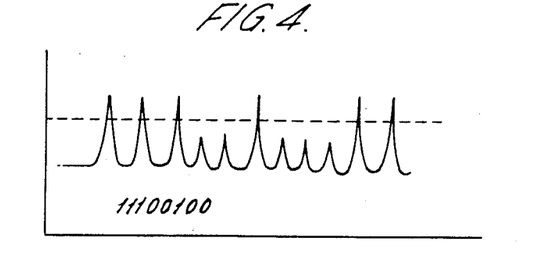
FIG. 4 is a diagram useful in explaining the operation of the system.

In the described embodiment, the coding of the selected "target" areas of the screen is achieved by alternately adding to and subtracting from the luminance signal of the video signal only over the respective target areas. Since the average luminance signal at a location on a stationary image on the display does not vary from one frame to the next, this coding by imparting a variation can readily be detected, even if the value added and subtracted to the luminance signal is relatively small. Further any spacial variation of the original luminance signal over the target area is retained, ie., the original picture is not destroyed and can still be seen in the target areas although there may be a discernable flickering in these areas. If each digit of the binary code is represented by the raised (or lowered) luminance level of the frame of the video, the bit rate is 50 bits per second, (for P.A.L. systems) which is far too fast to be visually decipherable. In FIG. 4, each peak represents the responses of a photo sensitive element in the probe 12 as one frame is traced on the T.V. screen and the code shown represents the binary number 1110010011. The number of different codes is limited by the requirement that binary numbers must be selected which do not have too many identical digits in sequence since this could lead to the generation of lower frequency flickering which might be then identified by the user.

Figure 9:
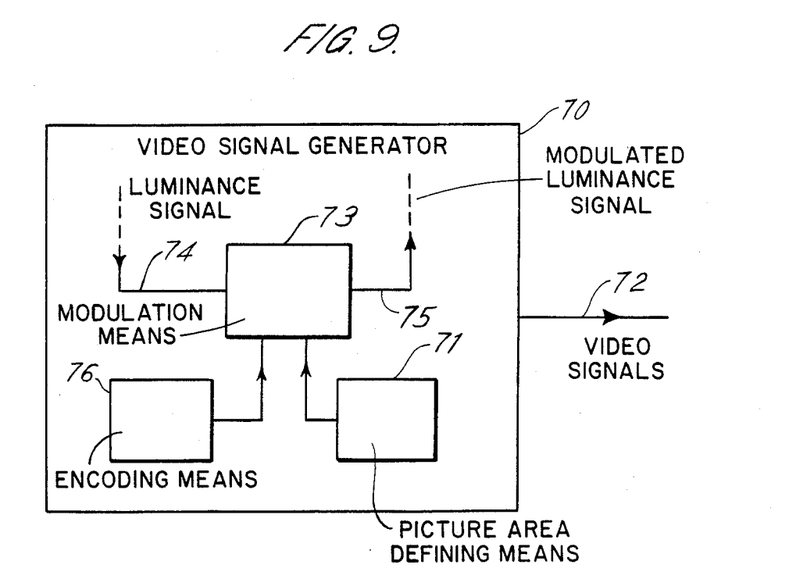
FIG. 9 is a block schematic diagram of the video signal generator used in the invention.

FIG. 9 shows essential elements of a video signal generator 70 used in the invention. A picture area defining means 71 defines at least one selected area of the video picture represented by the video signals produced by the generator on line 72. Modulation means 73 is responsive to the picture area defining means 71 and is arranged for modulating the original luminance signal generated in the generator 70 on a line 74 to produce a modulated luminance signal on line 75 to be included in the video signals from the generator. The modulation means 73 is arranged to alternately raise and lower the luminance level represented by the luminance signal in said at least one selected area of the picture without destroying the original luminance signal spacial variation across the area. In this way, the original picture content in the area is not destroyed. Encoding means 76 controls the modulation means 73 to raise and lower the luminance level in accordance with a binary code. The rate of alternate raising and lowering of the luminance level and the code format is selected to make the code visually undecipherable when viewed on the screen.

Figure 3:
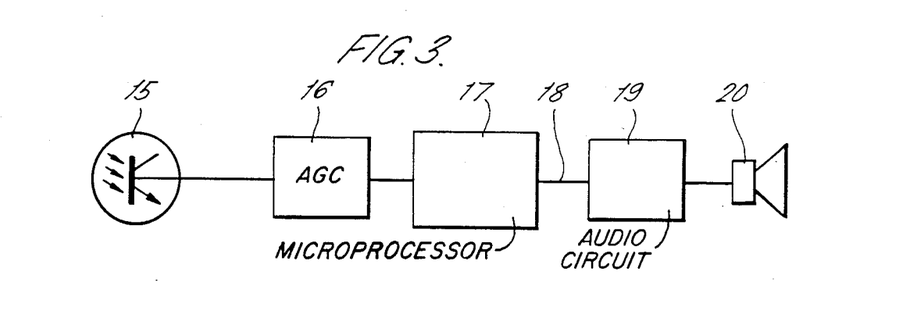
FIG. 3 is a block schematic diagram illustrating a part of the viewer's sensing probe.

The block diagram of the probe of FIG. 3 comprises a photo transistor 15 which is located at the base of the probe 13 which itself constitutes a rigid light guide so that it receives light from the screen of the VDU 11 in use of the system. The output signal from the transistor 15 is supplied to an automatic level and gain control circuit 16 which compensates for variations in the surrounding field intensity and provides certain discrimination between the ambient intensity and the peaks of the signal. The output from the AGC circuit 16 is supplied to a microprocessor 17 which identifies the binary code and selects the appropriate responses to feed out on the output line 18 to an audio circuit 19 controlling an acoustic transducer 20.

In one example the code generated on the "target" areas constitutes a cyclic information signal the first five bits of which constitute a "start" code enabling the microprocessor 17 of the response unit to identify the commencement of a code cycle and the remaining three bits of which constitute the answer information for response evaluation.

Figure 5:
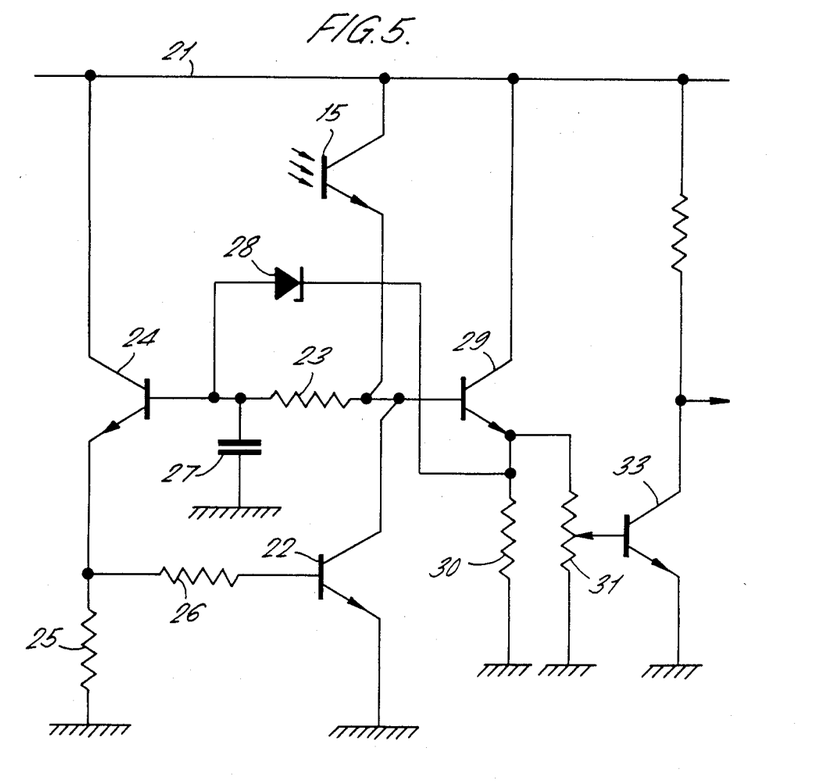
FIG. 5 is a circuit diagram of a part of the probe illustrated in FIG. 3.

In FIG. 5 the circuit comprises the photo transistor and automatic gain control circuit identified by the box 16 of FIG. 3. The transistor 15 is connected between a supply line 21 and a control transistor 22 the collector of which is connected via a resistor 23 to the base of a transistor 24 the collector of which is connected to the supply line 21 and the emitter of which is connected via a resistor 25 to the common or earth line. The emitter of the transistor 24 is also connected via a resistor 26 to the base of the controlling transistor 22.

The base of the transistor 24 is also earthed via a capacitor 27 and connected via Zener diode 28 to the emitter of a further transistor 29 connected as an emitter follower to serve as a buffer. The emitter of the transistor 29 is connected to the common line via a resistor 30 and a further resistor 31 constituting a potential divider for the base of a level detecting switching transistor 33 the collector voltage of which constitutes the input signal to the microprocessor 17 of FIG. 3.

The RC circuit constituted by the resistor 23 and the capacitor 27 acts as a delay circuit so that the sensor circuit follows the general or long term variations in light intensity. This way the circuit is not affected by the background lighting and retains the same sensitivity despite variation in the general level of illumination from the screen. The Zener diode 28 acts to shift the sensitivity threshold of the circuit so that when all the light intensity peaks on the screen are high those representating darker parts of the picture will not trigger the response unit. The effective discrimination threshold is thus shifted to lie between the effective light and dark intensity levels wherever they should be at different times.

Referring back to FIG. 3, the microprocessor 17 may include an integral timing component in the programme to check for failure to attempt a response. This could be done by providing in predetermined pattern to the coding sequence of the response evaluation codes so that the probe can determine not only whether the response is a correct one but also which question in a sequence that particular response is related to. In this way any omitted responses will be detected. A simple timer may alternatively be employed to fulfil the same function.

The number of correct answers may be stored in the unit as a code which can subsequently be matched to a final set of responses identified as bands or ranges of scores. The response unit will thus provide an indication when its sensor probe is held against the appropriate score band.

Figure 6:
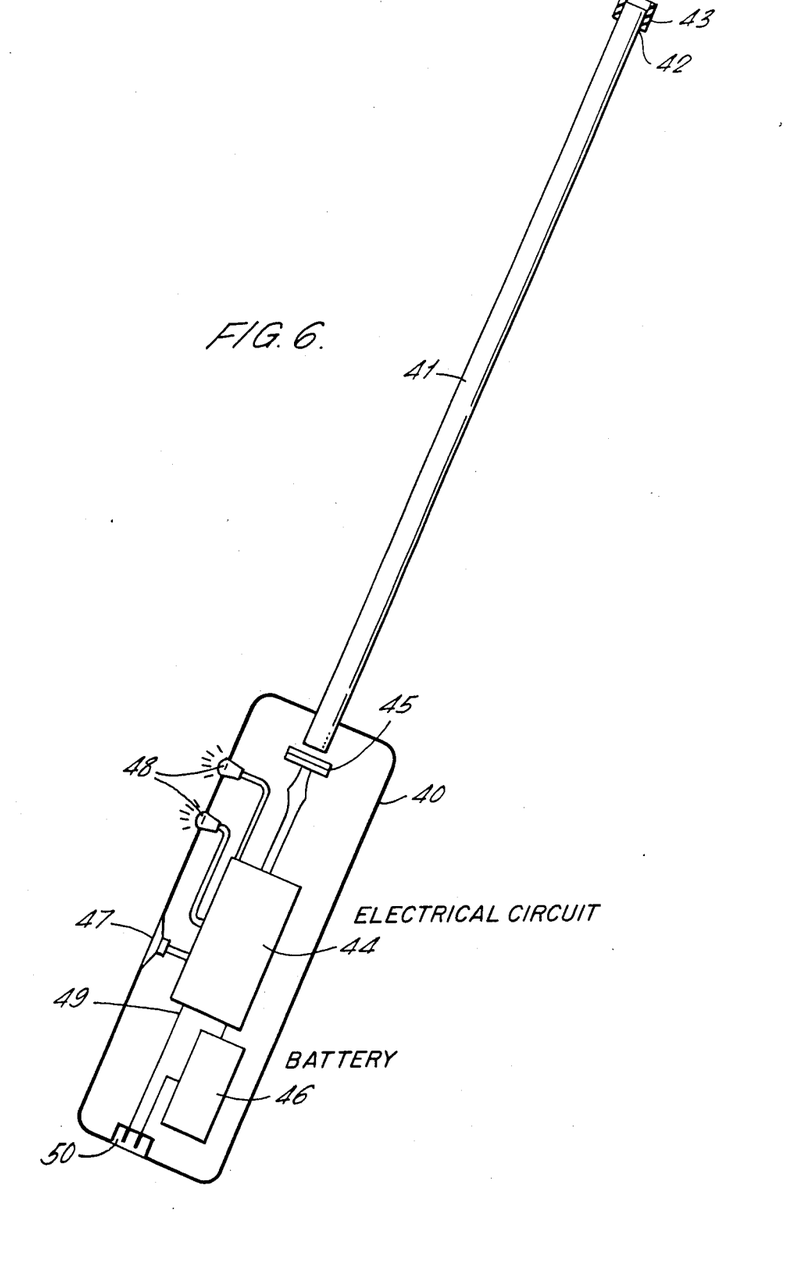
FIG. 6 is a schematic diagram illustrating the sensing probe in greater detail.

FIG. 6 illustrates diagrammatically the sensing probe in great detail. The probe comprises a casing 40 which also constitutes the handle of the probe. A pointer 41 extends from one end of the casing. The pointer 41 is formed as a rod of glass or plastics material to provide a light guide. The remote end 42 of the pointer 41 is shaped to enable light from the television screen to enter the pointer to be conducted down the light guide into the casing 40, when the pointer is positioned with its tip 42 touching or very close to a television screen. Conveniently, a soft plastic or rubber collar 43 may be provided encircling the tip 42 to prevent the tip from scratching the television screen and also to provide some control of the manner of which the tip is presented to the television screen.

The casing 40 contains electronic circuitry 44 to which is connected a photo transistor 45 located immediately adjacent the end face of the pointer 41 within the casing. In this way, light guided along the pointer 41 on the television screen illuminates the photo transistor 45. The electronic circuit 44 is powered from a rechargeable battery 46 and is arranged to perform the various functions described above including identifying code signals detected by the photo transistor 45 decoding the signals and reacting to the decoded signals in accordance with appropriate preprogramming. In the simplest arrangement, the circuitry 44 may react to the received coded signals by generating sounds at an acoustic transducer 47 to indicate whether the answer was correct or incorrect. Alternatively, the circuitry 44 may be arranged to illuminate selected indicator lamps 48. However, preferably the circuitry 44 comprises a microprocessor and memory which manipulates the decoded data and assembles data derived therefrom in its memory for subsequent dumping from the probe via an exit port 49. Both the exit port 49 and the rechargeable battery 46 may be connected to a socket 50 whereby the probe can be plugged into a recharging and data terminal for recording of dumped data from the microprocessor and supply of recharging current to the rechargeable battery 46.

Figure 7:
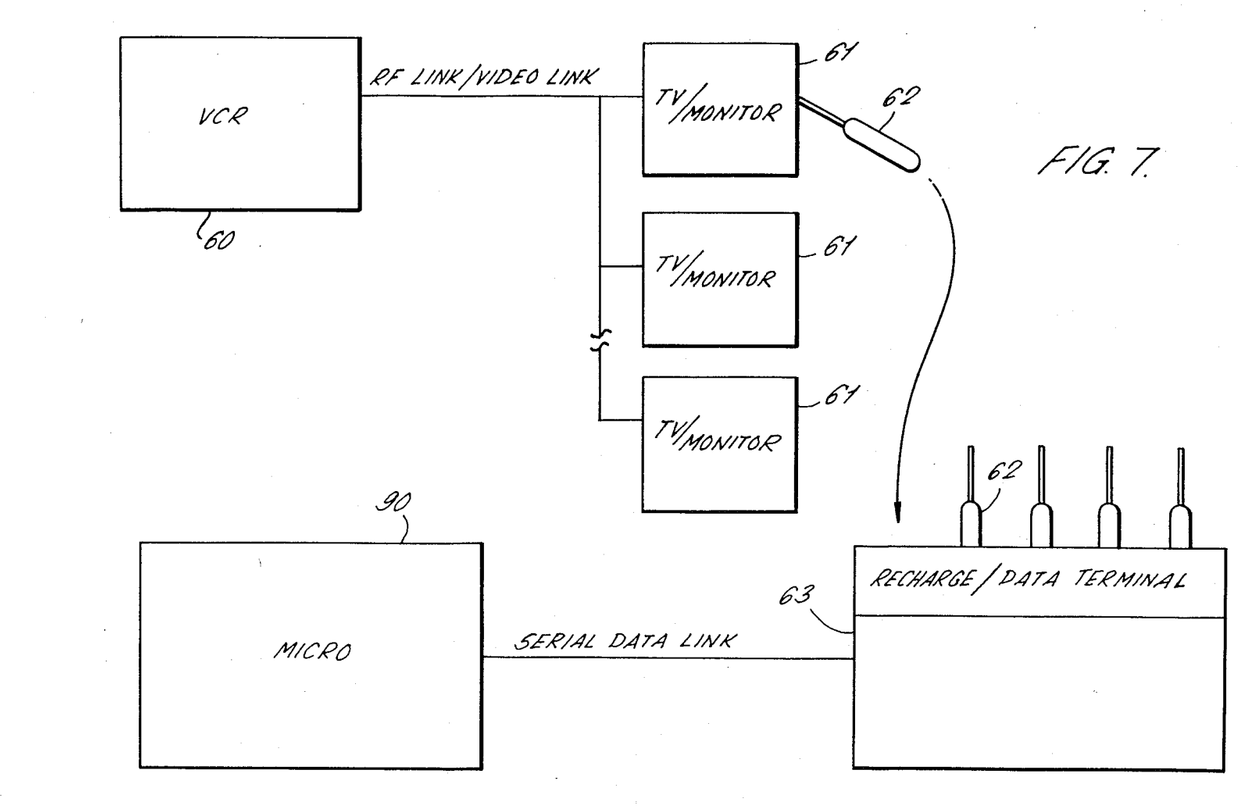
FIGS. 7 and 8 are block schematic diagrams of a multiple probe teaching installation.
Figure 8:
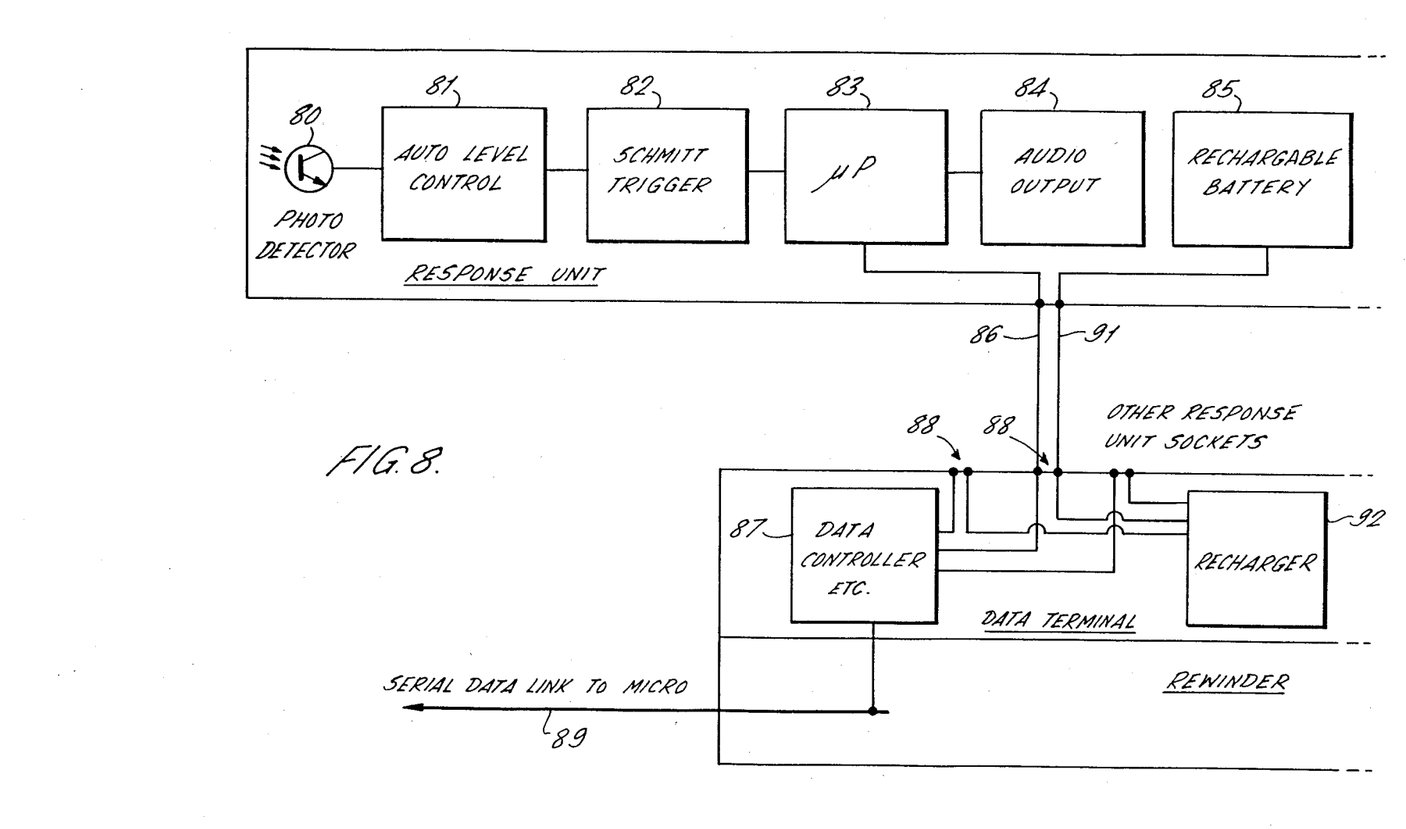

FIG. 7 shows how a number of probes such as that illustrated in FIG. 6 can be used in association with a central microprocessor based data handling system, and a close circuit T.V. system as a teaching aid. Instructional close circuit T.V. system as a teaching aid. Instructional programme material is supplied from a video cassette recorder 60 to a number of television monitors 61. At any of the monitors 61, a student can be equipped with a probe 62 and perform response routines as described above using the probe. The probe reads the various coded data from the television screen during the course of the response routine, providing such indications to the student as necessary and simultaneously manipulating and storing appropriate data in its memory. At the end of a session, the student can return the probe 62 to a recharge/data terminal 63 which makes connections to a probe 62 as illustrated in FIG. 8. In FIG. 8, the probe is shown block schematically comprising the photo detector 80, the automatic signal level control 81 as described above, a schmitt trigger 82 a microprocessor 83 and an audio output device 84 for generating acoustic signals as prompts to the student. The probe is powered from rechargeable battery 85. When connected to the rechargeably data terminal 63, data can be dumped from the memory of microprocessor 83 via a data line 86 to a data controller 87 in the terminal 63. The data controller 87 can receive data from a number of probes plugged in to respective sockets 88 of the terminal 63 and supply this data in an orderly fashion along a data link 89 to a central microprocessor system 90 which can be arranged to analyse the data for display and report purposes. Also when the probe is plugged in to the terminal 63, the rechargeable battery 85 is recharged along a recharging link 91 from a recharger 92.

In one example, the system described above could be used as a teaching aid as follows. The codes used in the target areas of the video display would be arranged to indicate that the selected answer is either correct, incorrect or almost correct. The code could also identify itself as the answer to one in a sequence of up to 16 question and answer periods. The responses recorded by the probe for different question and answer periods are stored by the probe in a different area of its memory. However, several different responses to the same question and answer period can be recorded in the respective memory location, so that some evaluation can be made of student performance if the student first gets an answer wrong but subsequently corrects his mistake.

For example, the random access memory in the probe may be arranged into four bit packages (nibbles) which enables data to be stored indicating:

(1) If the student has made any response to the particular question and answer sequence;

(2) If the student has made a serious error before finding the correct answer;

(3) If the student has made a slight error before finding the correct answer;

(4) If the student has had 0,1,2 or 3 or more prompting sounds when attempting to respond to a correct answer, this giving an indication of how difficult the student found the question.

The superimposition of the code data on to the original video signal defining the television picture being displayed can be achieved using various video mixing techniques which are well established in the art.

We claim:

1. Video response testing apparatus comprising video display apparatus including a display screen and for displaying video pictures on the screen, a generator for generating video signals, including a luminance signal, for display by the display apparatus of corresponding video pictures, the generator including picture area defining means for defining at least one selected area of the video picture represented by the video signals, modulation means responsive to the picture area defining means and arranged for modulating the luminance signal of the video signals, to alternately raise and lower the luminance level represented by the luminance signal in said at least one selected area without destroying the original luminance signal spacial variations across said area, whereby the original picture content in said area represented by said original luminance signal spacial variations is not destroyed, encoding means controlling the modulation means to raise and lower said luminance level in accordance with a desired binary code, the rate of alternate raising and lowering of said luminance level and the selection of code formats being such as to make the code visually undecipherable when viewed on the display screen, and a sensing probe including a photo sensitive element, the probe being positionable to enable the element to respond to variations in picture brightness in said selected area on the display screen and including decoding circuitry arranged to decode the binary code represented by said variations to provide decoded data.

2. Video response testing apparatus as claimed in claim 1, wherein the picture area defining means is arranged for defining a plurality of selected areas, each located to be associated with a respective symbol or element of the video picture.

3. Video response testing apparatus as claimed in claim 2 wherein each said area is located to be superimposed on at least part of its associated symbol or element.

4. Video response testing apparatus as claimed in claim 1 wherein the rate of raising and lowering of said luminance level is synchronised with successive fields of a T.V. scanned-type video display apparatus.

5. Video response testing apparatus as claimed in claim 4 wherein each successive field corresponds to one bit of the binary code.

6. Video response testing apparatus as claimed in claim 4 wherein the binary code is represented by successive serial words each of a predetermined number of bits and the code format is such that each word has substantially the same number of binary "0" and binary "1".

7. Video response testing apparatus as claimed in claim 1 wherein the sensing probe has a casing containing the photo sensitive element and decoding circuitry responsive thereto and an elongate light guide extending from the casing to conduct light entering a remote end of the guide down the guide and into the casing to illuminate the photo sensitive element.

8. Video response testing apparatus as claimed in claim 1 wherein the decoding circuitry includes indicating means to indicate the sense of the decoded data to a user of the probe.

9. Video response testing apparatus as claimed in claim 1 wherein the decoding circuitry includes a microprocessor and memory arranged to manipulate the decoded data and store indication derived therefrom in the memory, and a data exit port enabling the stored indications to be dumped from the memory to an external utilisation apparatus.

10. Video response testing apparatus as claimed in claim 5 wherein the binary code is represented by successive serial words each of a predetermined number of bits and the code format is such that each word has substantially the same number of binary "0" and binary "1".

* * * * *